United States Patent
Bae et al.

(10) Patent No.: US 12,219,049 B2
(45) Date of Patent: Feb. 4, 2025

(54) STORAGE DEVICE, METHOD FOR GENERATING KEY IN STORAGE DEVICE, AND METHOD FOR PERFORMING CERTIFICATION OF STORAGE DEVICE

(71) Applicant: Samsung Electronics Co., Ltd., Suwon-si (KR)

(72) Inventors: Mun Gyu Bae, Hwaseong-si (KR); Ji Soo Kim, Seongnam-si (KR); Hyun Soo Kwon, Hwaseong-si (KR); Youn Sung Chu, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 306 days.

(21) Appl. No.: 17/842,201

(22) Filed: Jun. 16, 2022

(65) Prior Publication Data

US 2023/0082136 A1    Mar. 16, 2023

(30) Foreign Application Priority Data

Sep. 15, 2021    (KR) .......................... 10-2021-0123214

(51) Int. Cl.
*H04L 9/08*     (2006.01)
*G06F 21/78*    (2013.01)
*H04L 9/32*     (2006.01)

(52) U.S. Cl.
CPC ............ *H04L 9/0825* (2013.01); *G06F 21/78* (2013.01); *H04L 9/0863* (2013.01); *H04L 9/0869* (2013.01); *H04L 9/3278* (2013.01)

(58) Field of Classification Search
CPC ... H04L 9/0825; H04L 9/0863; H04L 9/0869; H04L 9/3278; G06F 21/78
See application file for complete search history.

(56) References Cited

U.S. PATENT DOCUMENTS 6,307,936 B1 *  10/2001  Ober .................... G06F 21/82
                                                 380/46
7,392,401 B2    6/2008   Kohara et al.
(Continued)

FOREIGN PATENT DOCUMENTS

KR   10-2019-0078962 A    7/2019
KR   10-2020-0046481 A    5/2020
(Continued)

OTHER PUBLICATIONS

NPL Search History (Year: 2024).*
(Continued)

*Primary Examiner* — Samson B Lemma
*Assistant Examiner* — Richard W Cruz-Franqui
(74) *Attorney, Agent, or Firm* — Harness, Dickey & Pierce, P.L.C.

(57) ABSTRACT

A storage device having improved security reliability includes a non-volatile memory, and a storage controller configured to control an operation of the non-volatile memory, generate a key material, receive a key identification (ID) from a firmware, determine whether a salt value matching the key ID is stored in the non-volatile memory, generate a private key using the salt value stored in the non-volatile memory and the key material in response to determining that the salt value matching the key ID is stored in the non-volatile memory, and, in response to determining that the sale value matching the key ID is not stored in the non-volatile memory, receive a salt value from the firmware and generate the private key using the salt value from the firmware and the key material, and store the salt value used for generating the private key in the non-volatile memory.

19 Claims, 16 Drawing Sheets

(56) References Cited

U.S. PATENT DOCUMENTS

| | | |
|---|---|---|
| 8,423,789 B1 | 4/2013 | Poo et al. |
| 9,690,952 B2 | 6/2017 | Johnson |
| 9,904,651 B2* | 2/2018 | Park .................... G06F 13/4265 |
| 10,009,174 B2 | 6/2018 | Chou |
| 10,049,207 B2 | 8/2018 | Ramesh et al. |
| 10,742,406 B2 | 8/2020 | Pisasale et al. |
| 10,778,435 B1* | 9/2020 | Wimberley ............... H04L 9/30 |
| 10,880,081 B2 | 12/2020 | Kim et al. |
| 2007/0180230 A1* | 8/2007 | Cortez .................... H04L 9/302 |
| | | 713/156 |
| 2008/0069344 A1* | 3/2008 | Yao ....................... H04L 9/0844 |
| | | 713/171 |
| 2009/0210696 A1* | 8/2009 | Moreau ............... H04L 63/0435 |
| | | 713/151 |
| 2009/0300372 A1* | 12/2009 | Lee ...................... H04L 9/0637 |
| | | 713/193 |
| 2009/0316899 A1* | 12/2009 | Kim ...................... H04L 9/0637 |
| | | 380/255 |
| 2010/0211801 A1* | 8/2010 | Kim ......................... H04L 9/14 |
| | | 713/189 |
| 2013/0010957 A1* | 1/2013 | Yu ........................ H04L 9/0844 |
| | | 380/260 |
| 2013/0121488 A1* | 5/2013 | Kang ....................... G06F 21/78 |
| | | 380/44 |
| 2014/0115340 A1* | 4/2014 | Lee ......................... H04L 63/08 |
| | | 713/182 |
| 2014/0149745 A1* | 5/2014 | Suh ....................... H04L 9/3073 |
| | | 713/171 |
| 2015/0046712 A1* | 2/2015 | Korkishko ............ H04L 9/3234 |
| | | 713/170 |
| 2015/0089247 A1* | 3/2015 | Kang .................... G06F 21/305 |
| | | 713/193 |
| 2015/0227755 A1* | 8/2015 | Lee ......................... G06F 21/79 |
| | | 713/165 |
| 2016/0034413 A1* | 2/2016 | Park .................... G06F 13/4265 |
| | | 710/105 |
| 2016/0191235 A1* | 6/2016 | Kim ..................... G06F 3/0653 |
| | | 713/193 |
| 2016/0242030 A1* | 8/2016 | Pang ........................ H04L 9/002 |
| 2018/0032712 A1* | 2/2018 | Oh ........................ G06Q 20/227 |
| 2018/0062832 A1* | 3/2018 | Hatcher .............. H04L 63/0428 |
| 2018/0309580 A1* | 10/2018 | Jeon ..................... H04L 9/0643 |
| 2019/0044716 A1* | 2/2019 | Nemiroff .............. H04L 9/3242 |
| 2019/0238342 A1* | 8/2019 | Lian .................... H04L 63/0823 |
| 2019/0305970 A1* | 10/2019 | Satpathy ................. H04L 9/006 |
| 2020/0104101 A1* | 4/2020 | Satpathy ............... G06F 21/755 |
| 2020/0186340 A1* | 6/2020 | Du ........................ H04L 9/3239 |
| 2020/0186342 A1* | 6/2020 | Zhang ..................... G06F 21/78 |
| 2021/0273800 A1* | 9/2021 | Hassani ................ H04L 9/3242 |
| 2022/0021525 A1* | 1/2022 | Peddada ............... H04L 9/0841 |
| 2022/0116384 A1* | 4/2022 | Bartsch .................. G06F 21/72 |
| 2022/0247554 A1* | 8/2022 | Peddada ............... H04L 9/0897 |
| 2022/0261508 A1* | 8/2022 | Chuang ................. G06F 21/64 |
| 2022/0309496 A1* | 9/2022 | Agrawal ............... H04L 9/3218 |
| 2023/0032099 A1* | 2/2023 | Zheng ........................ H04L 9/14 |
| 2023/0070211 A1* | 3/2023 | Hosaka .................. H04L 51/04 |

FOREIGN PATENT DOCUMENTS

| | | |
|---|---|---|
| KR | 10-2020-0071682 A | 6/2020 |
| KR | 10-2020-0075451 A | 6/2020 |
| KR | 10-2021-0064854 A | 6/2021 |

OTHER PUBLICATIONS

'Frequently Asked Questions for the Cryptographic Algorithm Validation Program Concerning the Validation of Cryptographic Algorithm Implementations' *National Institute of Standards and Technology Communications Security Establishment of Canada*, CAVP, Dec. 3, 2009, pp. 1-57.

European Office Action dated Feb. 21, 2023 issued in corresponding European Appln. No. 22189304.3.

European Search Report dated Feb. 9, 2023 for corresponding European Application No. 22189304.3.

* cited by examiner

STORAGE DEVICE, METHOD FOR GENERATING KEY IN STORAGE DEVICE, AND METHOD FOR PERFORMING CERTIFICATION OF STORAGE DEVICE

CROSS-REFERENCE TO RELATED APPLICATION

This application claims priority from Korean Patent Application No. 10-2021-0123214 filed on Sep. 15, 2021 in the Korean Intellectual Property Office, and all the benefits accruing therefrom under 35 U.S.C. 119, the contents of which in its entirety are herein incorporated by reference.

BACKGROUND

Field

The inventive concepts relate to a storage device, a method for generating a key in a storage device, and a method for performing certification of a storage device.

Description of Related Art

In order to perform encryption or decryption processing based on an asymmetric-key algorithm in a storage device, a function of directly generating a key may be included in the storage device.

However, when the storage device itself generates the key, the key may be leaked to an outside when a security issue occurs, for example, firmware in the storage device is hacked.

SUMMARY

Some example embodiments of the inventive concepts provide a storage device having improved security reliability and capable of generating a key at a high-speed.

Further, some example embodiments of the inventive concepts provide a method for generating a key in a storage device having improved security reliability and capable of generating a key at a high-speed.

Further, some example embodiments of the inventive concepts provide a method for performing certification of a storage device having improved security reliability and capable of generating a key at a high-speed.

Example embodiments of the inventive concepts are not limited to the above-mentioned example embodiments. Other example embodiments according to the inventive concepts that are not mentioned may be understood based on following descriptions, and may be more clearly understood based on some example embodiments according to the present disclosure. Further, it will be easily understood that the some example embodiments according to the inventive concepts may be realized using means shown in the claims and combinations thereof.

A storage device according to some example embodiments of the inventive concepts includes a non-volatile memory, and a storage controller configured to control an operation of the non-volatile memory, generate a key material, receive a key identification (ID) from a firmware, determine whether a salt value matching the key ID is stored in the non-volatile memory, generate a private key using the salt value stored in the non-volatile memory and the key material in response to determining that the salt value matching the key ID is stored in the non-volatile memory, and in response to determining that the salt value matching the key ID is not stored in the non-volatile memory, receive a salt value from the firmware and generate the private key using the salt value from the firmware and the key material, and store the salt value used for generating the private key in the non-volatile memory.

A storage device according to some example embodiments for achieving the inventive concepts includes a non-volatile memory, and a storage controller configured to control an operation of the non-volatile memory, generate a key material, receive a salt value from a firmware, generate a private key using the salt value and the key material, store the salt value in the non-volatile memory, and perform an asymmetric encryption operation using an asymmetric-key algorithm.

A storage device according to some example embodiments of the inventive concepts includes a non-volatile memory, and a storage controller configured to control an operation of the non-volatile memory, receive a certification request from a host device, generate certification information based on a private key in response to receiving the certification request, wherein the private key is generated using a salt value stored in the non-volatile memory and a key material generated by a key material generator, and transmit the certification information to the host device.

A method for generating a key in a storage device according to some example embodiments of the inventive concepts includes receiving a salt value from a firmware, generating a key material, generating a private key using the salt value from the firmware and the key material, storing the generated private key, and storing the salt value used for generating the private key in a non-volatile memory.

A method for generating a key in a storage device according to some example embodiments of the inventive concepts includes receiving a key ID from a firmware, generating a key material, generating a first private key using a salt value stored in a non-volatile memory and the key material, in response to the salt value stored in the non-volatile memory matching the key ID; receiving a salt value from the firmware and generating a second private key using the salt value from the firmware and the key material, in response to the salt value matching the key ID not being stored in the non-volatile memory, and storing the salt value used for generating the second private key in the non-volatile memory.

A method for performing certification of a storage device according to some example embodiments of the inventive concepts includes receiving a certification request from a host device, in response to reception of the certification request, generating certification information based on a private key, wherein the private key is generated using a salt value stored in a non-volatile memory and a key material, and transmitting the certification information to the host device.

Specific details of other example embodiments are included in detailed descriptions and drawings.

BRIEF DESCRIPTION OF DRAWINGS

The above and other example embodiments of the inventive concepts will become more apparent by describing in detail some example embodiments thereof with reference to the attached drawings, in which.

DETAILED DESCRIPTIONS

Hereinafter, some example embodiments of the inventive concepts will be described with reference to the accompanying drawings.

Figure 1:
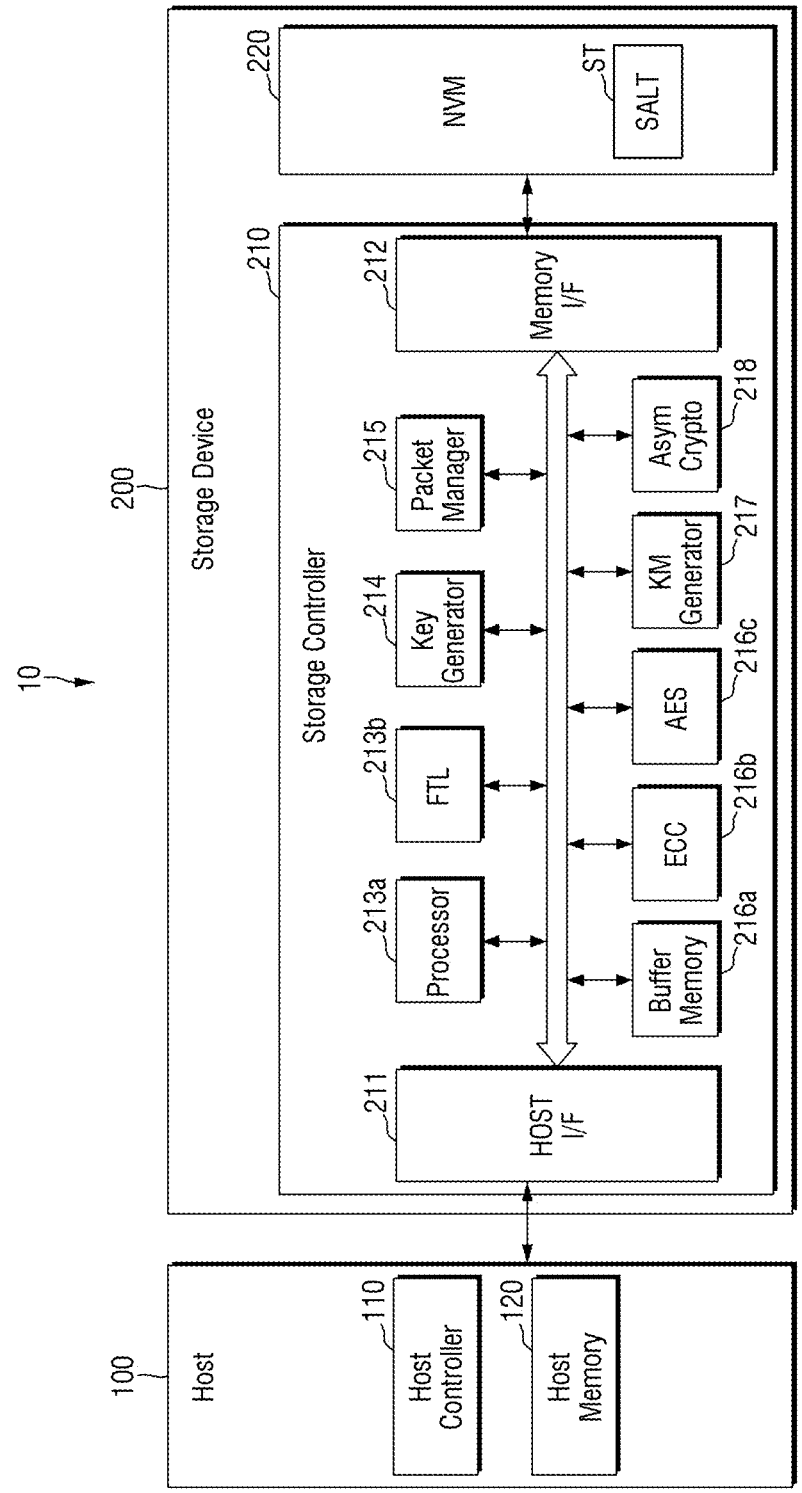
FIG. 1 is a block diagram illustrating a memory system according to some example embodiments.
Figure 2:
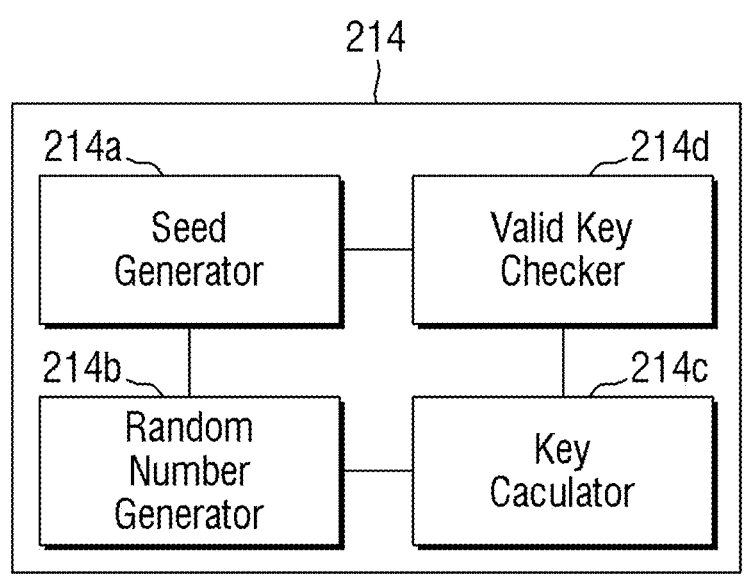
FIG. 2 is a diagram showing a key generator of FIG. 1.

FIG. 1 is a block diagram illustrating a memory system according to some example embodiments. FIG. 2 is a diagram showing a key generator of FIG. 1.

Referring to FIG. 1, a memory system 10 may include a host device 100 and/or a storage device 200. The storage device 200 may include a storage controller 210 and/or a non-volatile memory (NVM) 220. The host device 100 may include a host controller 110 and/or a host memory 120. The host memory 120 may function as a buffer memory for temporarily storing therein data to be transmitted to the storage device 200 or data received from the storage device 200.

The storage device 200 may include storage media for storing therein data according to a request from the host device 100. For example, the storage device 200 may include at least one of an SSD (solid state drive), an embedded memory, and/or a removable external memory. When the storage device 200 is embodied as the SSD, the storage device 200 may be, for example, a device complying with a NVMe (non-volatile memory express) standard.

When the storage device 200 is embodied as the embedded memory or the external memory, the storage device 200 may be a device complying with a UFS (universal flash storage) or eMMC (embedded multi-media card) standard. Each or one or more of the host device 100 and the storage device 200 may generate and transmit a packet according to a corresponding employed standard protocol.

When the non-volatile memory 220 of the storage device 200 includes a flash memory, the flash memory may include a 2D NAND memory array and/or a 3D (or vertical) NAND (VNAND) memory array. In another example, the storage device 200 may include various other types of non-volatile memories. For example, the storage device 200 may include MRAM (Magnetic RAM), Spin-Transfer Torque MRAM, Conductive bridging RAM (CBRAM), FeRAM (Ferroelectric RAM), PRAM (Phase RAM), Resistive memory (Resistive RAM) and/or various other types of memories.

In some example embodiments, the host controller 110 and the host memory 120 may be implemented as separate semiconductor chips. Further, in some example embodiments, the host controller 110 and the host memory 120 may be integrated into the same semiconductor chip. In an example, the host controller 110 may act as one of a plurality of modules included in an application processor, and the application processor may be implemented as a system on chip (SoC). Further, the host memory 120 may act as an embedded memory provided in the application processor and/or as a non-volatile memory or a memory module disposed outside the application processor.

The host controller 110 may manage an operation of storing data of a buffer area (e.g., write data) in the non-volatile memory 220, and/or storing data of the non-volatile memory 220 (e.g., read-out data) in the buffer area.

The storage controller 210 may include a host interface 211 and/or a memory interface 212. Further, the storage controller 210 may include a processor 213a, a flash translation layer (FTL) 213b, a key generator 214, a packet manager 215, a buffer memory 216a, an ECC (error correction code) engine 216b, an AES (advanced encryption standard) engine 216c, a key material generator 217, and/or an asymmetric cryptographic module 218.

The storage controller 210 may further include a working memory (not shown) into which the flash translation layer (FTL) 213b is loaded. An operation of writing or reading data to or from the non-volatile memory 220 may be controlled by the processor 213a executing the flash translation layer 213b.

The host interface 211 may transmit/receive a packet to/from the host device 100. The packet transmitted from the host device 100 to the host interface 211 may include a command or data to be written to the non-volatile memory 220. The packet transmitted from the host interface 211 to the host device 100 may include a response to a command or data read from the non-volatile memory 220.

The memory interface 212 may transmit data to be written to the non-volatile memory 220 to the non-volatile memory 220 and/or receive data read from the non-volatile memory 220. The memory interface 212 may be implemented to comply with a standard protocol such as toggle and/or ONFI.

The flash translation layer 213b may perform several functions such as address mapping, wear-leveling, and/or garbage collection. The address mapping operation may refer to an operation of converting a logical address received from the host device into a physical address used to actually store data in the non-volatile memory 220.

The wear-leveling may refer to a scheme to ensure that blocks in the non-volatile memory 220 are used uniformly to reduce or prevent excessive degradation of a specific block. The garbage collection may refer to a scheme of copying valid data of a block to a new block and then erasing the former block to secure available capacity in the non-volatile memory 220.

The key generator 214 may generate a private key required or sufficient for an operation of the asymmetric cryptographic module 218. A salt value ST used by the key generator 214 to generate the private key may be stored in the non-volatile memory 220. In some example embodiments, the key generator 214 may be implemented in hardware. However, example embodiments are not limited thereto.

Referring to FIG. 2, the key generator 214 may include a seed generator 214a, a random number generator 214b, a key calculator 214c, and/or a valid key checker 214d.

The seed generator 214a may generate a seed based on the salt value provided from firmware operating the storage device (200 in FIG. 1) and/or a key material provided from the key material generator (217 in FIG. 1).

In some example embodiments, the seed generator 214a may generate, as the seed, a hash value based on the salt value provided from the firmware and/or the key material provided from the key material generator (217 of FIG. 1). However, example embodiments are not limited thereto.

The random number generator 214b may generate a random number based on the seed generated by the seed generator 214a.

In some example embodiments, the random number generator 214b may include a DRBG (Deterministic Random Bit Generator). When the random number generator 214b includes the DRBG, the random number generator 214b may generate the same result value via a deterministic algorithm on the same seed (input).

In some example embodiments, the random number generator 214b may generate a first random number and a second random number based on the seed generated by the seed generator 214a. Then, the random number generator 214b may identify whether each or one or more of the generated first random number and second random number is appropriate for generating the private key. In some embodiments, the random number generator 214b may identify whether each or one or more of the generated first random number and second random number is a prime number. When each or one or more of the first and second random number is the prime number, the random number generator 214b may provide the first and second random numbers to the key calculator 214c. Conversely, when each or one or more of the first and second random numbers is not the prime number, the random number generator 214b may re-generate the first random number and the second random number.

The key calculator 214c may generate a primitive key based on the random number generated by the random number generator 214b. For example, the key calculator 214c may receive the random number generated by the random number generator 214b and may perform a predetermined (or alternately given) calculation to generate the primitive key.

The valid key checker 214d may verify whether the primitive key generated by the key calculator 214c is a valid key. In some example embodiments, the valid key checker 214d may perform the verification by comparing the primitive key generated by the key calculator 214c with a public key and then identifying whether they are mutually relatively prime. However, embodiments are not limited thereto.

A more detailed description of an operation of the key generator 214 will be described later.

Referring back to FIG. 1, the packet manager 215 may generate a packet according to a protocol of an interface with which the packet manager 215 and the host device 100 agree, and/or may parse various information from a packet received from the host device 100.

The buffer memory 216a may temporarily store therein data to be written to or read from the non-volatile memory 220. The buffer memory 216a may be a component provided in the storage controller 210, and/or may be disposed outside the storage controller 210 according to some example embodiments.

The ECC engine 216b may perform an error detection and correction function on read-out data read from the non-volatile memory 220. For example, the ECC engine 216b may generate parity bits for to-be-written data to be written into the non-volatile memory 220. The generated parity bits together with the to-be-written data may be stored in the non-volatile memory 220. When reading data from the non-volatile memory 220, the ECC engine 216b may use the parity bits read from the non-volatile memory 220 together with the read-out data to correct an error of the read-out data and output the corrected read-out data.

The AES engine 216c may perform at least one of an encryption operation and/or a decryption operation on data input to the storage controller 210 using a symmetric-key algorithm.

The key material generator 217 may generate a key material necessary or sufficient for the key generator 214 to generate the private key. In this connection, the key material may be unique information related to the storage device 200. That is, different storage devices 200 may have different key materials. For example, a first storage device may generate a first key material, while a second storage device may generate a second key material which is different from the first key material.

In some embodiments, the key material generator 217 may generate the key material using at least one of PUF (Physical Unclonable Function) and/or OTP (One Time Password). However, example embodiments are not limited thereto.

The asymmetric cryptographic module 218 may perform an asymmetric encryption operation using an asymmetric-key algorithm. An operation of the asymmetric cryptographic module 218 may be distinguished from an encryption operation performed by the AES engine 216c using the symmetric-key algorithm.

The private key generated by the key generator 214 may be stored in the asymmetric cryptographic module 218 and may be used for the encryption operation of the asymmetric cryptographic module 218.

Figure 3:
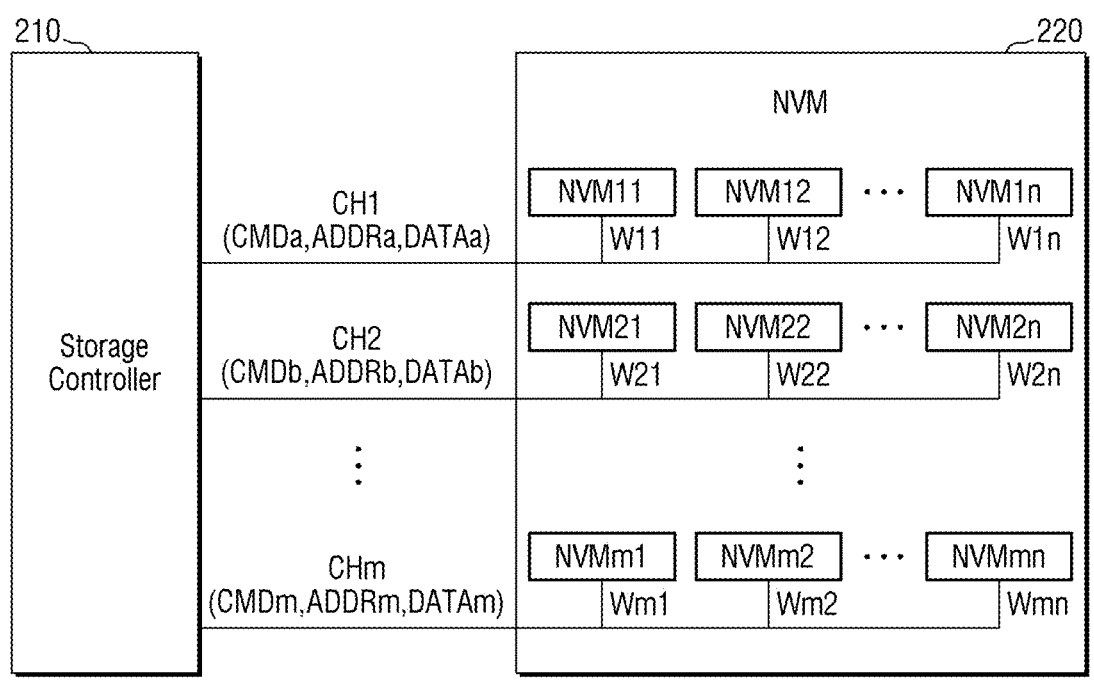
FIG. 3 is a diagram showing a reconfiguration of a storage controller and a non-volatile memory of the storage device of FIG. 1.

FIG. 3 is a diagram of a reconfiguration of the storage controller and the non-volatile memory of the storage device of FIG. 1.

Referring to FIG. 3, the storage device 200 may include the non-volatile memory 220 and/or the storage controller 210. The storage device 200 may support a plurality of channels CH1 to CHm. The non-volatile memory 220 and the storage controller 210 may be connected to each other via the plurality of channels CH1 to CHm. For example, the storage device 200 may be implemented as, for example, an SSD (solid state drive).

The non-volatile memory 220 may include a plurality of non-volatile memory devices NVM11 to NVMmn Each or one or more of the non-volatile memory devices NVM11 to NVMmn may be connected to one of the plurality of channels CH1 to CHm via a corresponding way. For example, the non-volatile memory devices NVM11 to NVM1n may be connected to the first channel CH1 via ways W11 to W1n. The non-volatile memory devices NVM21 to NVM2n may be connected to the second channel CH2 via ways W21 to W2n. In some example embodiments, each or one or more of the non-volatile memory devices NVM11 to NVMmn may be implemented as an arbitrary memory unit capable of operating according to an individual command from the storage controller 210. For example, each or one or more of the non-volatile memory devices NVM11 to NVMmn may be implemented as a chip or a die. However, the inventive concepts are not limited thereto.

The storage controller 210 may transmit and receive signals to and from the non-volatile memory 220 via the plurality of channels CH1 to CHm. For example, the storage controller 210 may transmit commands CMDa to CMDm, addresses ADDRa to ADDRm, and/or data DATAa to DATAm to the non-volatile memory 220 via the channels CH1 to CHm, may and/or receive the data DATAa to DATAm from the volatile memory 220 via the channels CH1 to CHm.

The storage controller 210 may select one of the non-volatile memory devices connected to a corresponding channel via the corresponding channel, and may transmit and/or receive signals to and/or from the selected non-volatile memory device via the corresponding channel. For example, the storage controller 210 may select the non-volatile memory device NVM11 from among the non-volatile memory devices NVM11 to NVM1n connected to the first channel CH1. The storage controller 210 may transmit the command CMDa, the address ADDRa, and/or the data DATAa to the selected non-volatile memory device NVM11 via the first channel CH1, and/or may receive the data DATAa from the selected non-volatile memory device NVM11 via the first channel CH1.

The storage controller 210 may transmit and/or receive signals to and/or from the non-volatile memory 220 in a parallel manner via different channels. For example, the storage controller 210 may transmit the command CMDb to the non-volatile memory 220 via the second channel CH2 while transmitting the command CMDa to the non-volatile memory 220 via the first channel CH1. For example, the storage controller 210 may receive the data DATAb from the non-volatile memory 220 via the second channel CH2 while receiving the data DATAa from the non-volatile memory 220 via the first channel CH1.

The storage controller 210 may control overall operations of the non-volatile memory 220. The storage controller 210 may transmit a signal to the channels CH1 to CHm to control each or one or more of the non-volatile memory devices NVM11 to NVMmn connected to the channels CH1 to CHm. For example, the storage controller 210 may transmit the command CMDa and the address ADDRa to the first channel CH1 to control a selected one of the non-volatile memory devices NVM11 to NVM1n.

Each or one or more of the non-volatile memory devices NVM11 to NVMmn may operate under control of the storage controller 210. For example, the non-volatile memory device NVM11 may program (or write) the data DATAa based on the command CMDa, the address ADDRa, and/or the data DATAa provided to the first channel CH1. For example, the non-volatile memory device NVM21 may read the data DATAb based on the command CMDb and the address ADDRb provided to the second channel CH2, and may transmit the read data DATAb to the storage controller 210.

In FIG. 3, an example in which the non-volatile memory 220 communicates with the storage controller 210 via the m channels and the non-volatile memory 220 includes the n non-volatile memory devices corresponding to each channel is described. However, example embodiments are not limited thereto. The number of the channels and the number of the non-volatile memory devices connected to one channel may be variously modified. The salt value ST of FIG. 1 as described above may be transferred to and stored in the non-volatile memory 220 in a form of the data DATAa to DATAm.

Figure 4:
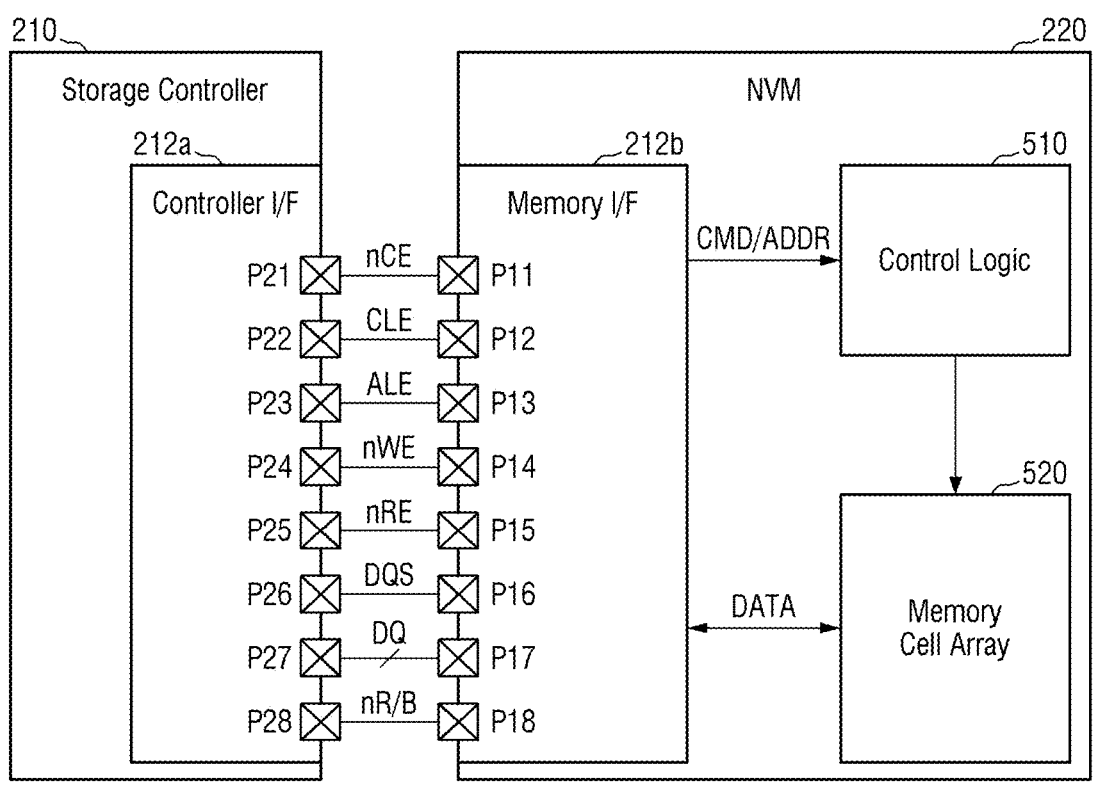
FIG. 4 is a diagram showing a reconfiguration of a storage controller, a memory interface, and a non-volatile memory of FIG. 1.

FIG. 4 is a diagram showing a reconfiguration of the storage controller, the memory interface, and the non-volatile memory of FIG. 1. The memory interface 212 in FIG. 1 may include a controller interface circuit 212a in FIG. 4.

The non-volatile memory 220 may include first to eighth pins P11 to P18, a memory interface circuit 212b, a control logic circuit 510, and/or a memory cell array 520.

The memory interface circuit 212b may receive a chip enable signal nCE from the storage controller 210 via the first pin P11. The memory interface circuit 212b may transmit and/or receive signals to and/or from the storage controller 210 via the second to eighth pins P12 to P18 based on the chip enable signal nCE. For example, when the chip enable signal nCE is in an enable state, for example, a low level state, the memory interface circuit 212b may transmit and/or receive signals to and/or from the storage controller 210 via the second to eighth pins P12 to P18.

The memory interface circuit 212b may receive a command latch enable signal CLE, an address latch enable signal ALE, and/or a write enable signal nWE from the storage controller 210 via the second to the fourth pins P12 to P14. The memory interface circuit 212b may receive a data signal DQ from the storage controller 210 and/or transmit the data signal DQ to the storage controller 210 via the seventh pin P17. A command CMD, an address ADDR, and/or data DATA may be transmitted while being included in the data signal DQ. For example, the data signal DQ may be transmitted via a plurality of data signal lines. In this case, the seventh pin P17 may include a plurality of pins corresponding to the plurality of data signals.

The memory interface circuit 212b may acquire the command CMD from the data signal DQ received for an enable period (e.g., a high level state) of the command latch enable signal CLE, based on toggle timings of the write enable signal nWE. The memory interface circuit 212b may acquire the address ADDR from the data signal DQ received for an enable period (e.g., a high level state) of the address latch enable signal ALE, based on the toggle timings of the write enable signal nWE.

In some example embodiments, the write enable signal nWE may be maintained at a static state (e.g., a high level state or a low level state) and then may toggle between a high level state and a low level state. For example, the write enable signal nWE may toggle for a period for which the command CMD and/or the address ADDR is transmitted. Accordingly, the memory interface circuit 212b may acquire the command CMD and/or the address ADDR based on the toggle timings of the write enable signal nWE.

The memory interface circuit 212b may receive a read enable signal nRE from the storage controller 210 via the fifth pin P15. The memory interface circuit 212b may receive a data strobe signal DQS from the storage controller 210 and/or transmit the data strobe signal DQS to the storage controller 210 via the sixth pin P16.

In a data DATA output operation of the non-volatile memory 220, the memory interface circuit 212b may receive a toggling read enable signal nRE via the fifth pin P15 before outputting the data DATA. The memory interface circuit 212b may generate a toggling data strobe signal DQS based on toggling of the read enable signal nRE. For example, the memory interface circuit 212b may generate the data strobe signal DQS that starts toggling after a predetermined (or alternately given) delay (for example, tDQSRE) from a toggling start time of the read enable signal nRE. The memory interface circuit 212b may transmit the data signal DQ including the data DATA based on a toggle timing of the data strobe signal DQS. Accordingly, the data DATA may be transmitted to the storage controller 210 at an aligned timing with the toggle timing of the data strobe signal DQS. Under this operation, the salt value ST of FIG. 1 stored in the non-volatile memory 220 as described above may be provided to the storage controller 210.

In a data DATA input operation of the non-volatile memory 220, upon receiving the data signal DQ including the data DATA from the storage controller 210, the memory interface circuit 212b may receive a toggling data strobe signal DQS together with the data DATA from the storage controller 210. The memory interface circuit 212b may acquire the data DATA from the data signal DQ based on the toggle timing of the data strobe signal DQS. For example, the memory interface circuit 212b may acquire the data DATA by sampling the data signal DQ at a rising edge and/or a falling edge of the data strobe signal DQS. Under this operation, the salt value ST of FIG. 1 stored in the non-volatile memory 220 as described above may be transferred from the storage controller 210 to the non-volatile memory 220 and may be stored therein.

The memory interface circuit 212b may transmit a ready/busy output signal nR/B to the storage controller 210 via the eighth pin P18. The memory interface circuit 212b may transmit state information of the non-volatile memory 220 to the storage controller 210 using the ready/busy output signal nR/B. When the non-volatile memory 220 is in a busy state (that is, when internal operations of the non-volatile memory 220 are being performed), the memory interface circuit 212b may transmit the ready/busy output signal nR/B indicating the busy state to the storage controller 210. When the non-volatile memory 220 is in a ready state, (that is, when internal operations of the non-volatile memory 220 are not performed or are completed, the memory interface circuit 212b transmits the ready/busy output signal nR/B indicating the ready state to the storage controller 210.

For example, while the non-volatile memory 220 reads the data DATA from the memory cell array 520 in response to a page read command, the memory interface circuit 212b may transmit the ready/busy output signal nR/B indicating the busy state (e.g., a low level state) to the storage controller 210. For example, while the non-volatile memory 220 programs the data DATA into the memory cell array 520 in response to a program command, the memory interface circuit 212b may transmit the ready/busy output signal nR/B indicating the busy state to the storage controller 210.

The control logic circuit 510 may control all or one or more of various operations of the non-volatile memory 220. The control logic circuit 510 may receive the command/address CMD/ADDR obtained from the memory interface circuit 212b. The control logic circuit 510 may generate control signals for controlling other components of the non-volatile memory 220 according to the received command/address CMD/ADDR. For example, the control logic circuit 510 may generate various control signals for programing the data DATA in the memory cell array 520 and/or reading the data DATA from the memory cell array 520.

The memory cell array 520 may store therein the data DATA obtained from the memory interface circuit 212b under control of the control logic circuit 510. The memory cell array 520 may output the stored data DATA to the memory interface circuit 212b under control of the control logic circuit 510.

The memory cell array 520 may include a plurality of memory cells. For example, the plurality of memory cells may be flash memory cells. However, inventive concepts are not limited thereto. The memory cells may include RRAM (Resistive Random Access Memory) cells, FRAM (Ferroelectric Random Access Memory) cells, PRAM (Phase Change Random Access Memory) cells, TRAM (Thyristor Random Access Memory) cells, and/or MRAM (Magnetic Random Access Memory) cells, etc. Hereinafter, example embodiments of the inventive concepts will be described based on an example in which the memory cells are embodied as NAND flash memory cells.

The storage controller 210 may include first to eighth pins P21 to P28, and the controller interface circuit 212a. The first to eighth pins P21 to P28 may respectively correspond to the first to eighth pins P11 to P18 of the non-volatile memory 220.

The controller interface circuit 212a may transmit the chip enable signal nCE to the non-volatile memory 220 via the first pin P21. The controller interface circuit 212a may transmit and receive signals to and/or from the non-volatile memory 220 selected based on the chip enable signal nCE via the second to eighth pins P22 to P28.

The controller interface circuit 212a may transmit the command latch enable signal CLE, the address latch enable signal ALE, and/or the write enable signal nWE to the non-volatile memory 220 via the second to the fourth pins P22 to P24. The controller interface circuit 212a may transmit the data signal DQ to the non-volatile memory 220 via the seventh pin P27 and/or receive the data signal DQ from the non-volatile memory 220 via the seventh pin P27.

The controller interface circuit 212a may transmit the data signal DQ including the command CMD and/or the address ADDR together with a toggling write enable signal nWE to the non-volatile memory 220. The controller interface circuit 212a may transmit the data signal DQ including the command CMD to the non-volatile memory 220 as the command latch enable signal CLE having the enable state is transmitted. The controller interface circuit 212a may transmit the data signal DQ including the address ADDR to non-volatile memory 220 as the address latch enable signal ALE having the enable state is transmitted.

The controller interface circuit 212a may transmit the read enable signal nRE to the non-volatile memory 220 via the fifth pin P25. The controller interface circuit 212a may receive the data strobe signal DQS from the non-volatile memory 220 via the sixth pin P26 and/or transmit the data strobe signal DQS to the non-volatile memory 220 via the sixth pin P26.

In a data DATA output operation of the non-volatile memory 220, the controller interface circuit 212a may generate a toggling read enable signal nRE and transmit the read enable signal nRE to the non-volatile memory 220. For example, the controller interface circuit 212a may generate the read enable signal nRE whose a state is changed from a fixed state (for example, a high level state or a low level state) to a toggling state, before the data DATA is output. Accordingly, the non-volatile memory 220 may generate a toggling data strobe signal DQS based on the read enable signal nRE. The controller interface circuit 212a may receive the data signal DQ including the data DATA together with a toggling data strobe signal DQS from the non-volatile memory 220. The controller interface circuit 212a may acquire the data DATA from the data signal DQ based on the toggle timing of the data strobe signal DQS. Under this operation, the salt value ST of FIG. 1 stored in the non-volatile memory 220 as described above may be provided to the storage controller 210.

In a data DATA input operation of the non-volatile memory 220, the controller interface circuit 212a may generate a toggling data strobe signal DQS. For example, the controller interface circuit 212a may generate the data strobe signal DQS whose a state is changed from a fixed state, for example, a high level state or a low level state, to a toggling state, before transmitting the data DATA. The controller interface circuit 212a may transmit the data signal DQ including data DATA to the non-volatile memory 220 based on the toggle timings of the data strobe signal DQS. Under this operation, the salt value ST of FIG. 1 stored in the non-volatile memory 220 as described above may be provided from the storage controller 210 to the non-volatile memory 220 and may be stored therein.

The controller interface circuit 212a may receive the ready/busy output signal nR/B from the non-volatile memory 220 via the eighth pin P28. The controller interface circuit 212a may determine the state information of the non-volatile memory 220 based on the ready/busy output signal nR/B.

Figure 5:
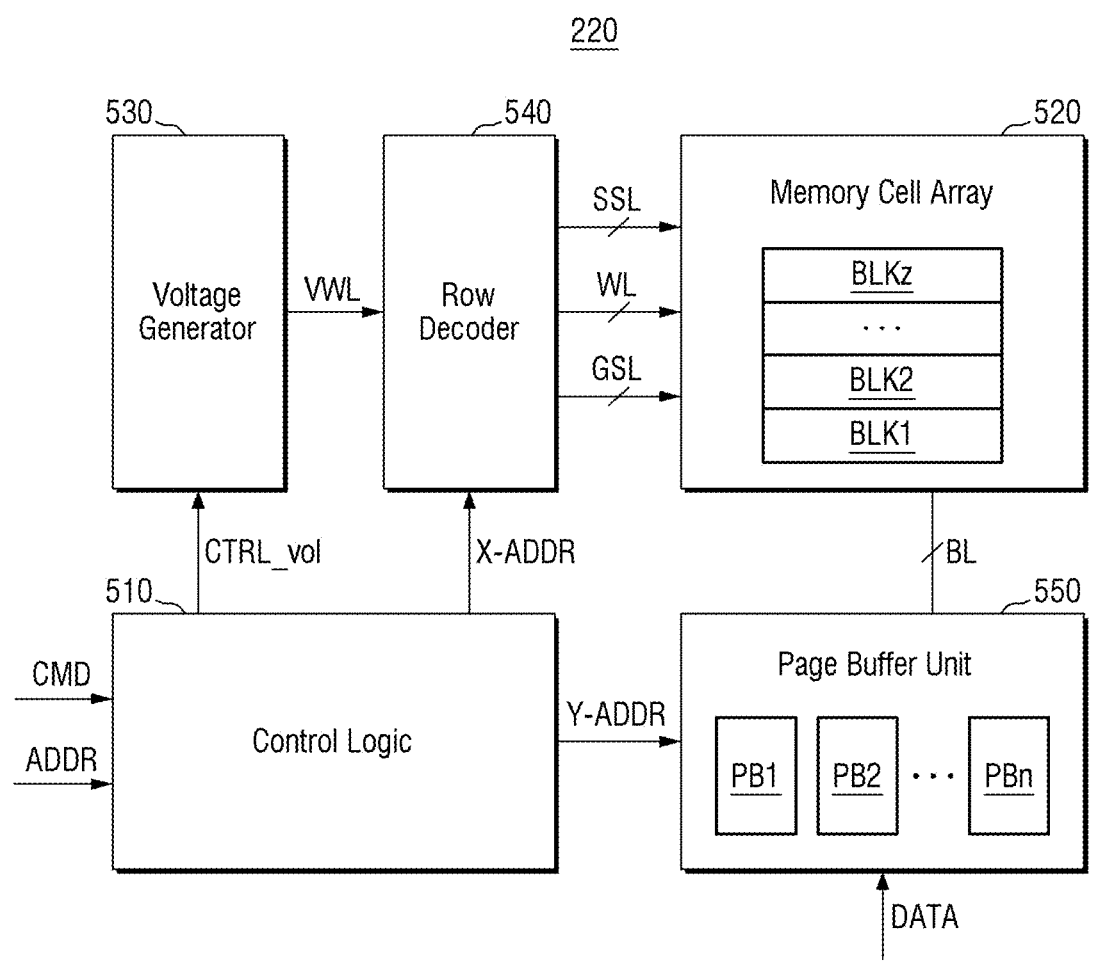
FIG. 5 is an example block diagram showing the non-volatile memory of FIG. 4.

FIG. 5 is a block diagram showing the non-volatile memory of FIG. 4 according to some embodiments.

Referring to FIG. 5, the non-volatile memory 220 may include a control logic circuit 510, a memory cell array 520, a page buffer 550, a voltage generator 530, and/or a row decoder 540. Although not shown in FIG. 5, the non-volatile memory 220 may further include the memory interface circuit 212b shown in FIG. 4. The non-volatile memory 220 may further include a column logic, a pre-decoder, a temperature sensor, a command decoder, and/or an address decoder, etc.

The control logic circuit 510 may control all or one or more of various operations of the non-volatile memory 220. The control logic circuit 510 may output various control signals in response to the command CMD and/or the address ADDR from the memory interface circuit (212b in FIG. 4). For example, the control logic circuit 510 may output a voltage control signal CTRL_vol, a row address X-ADDR, and/or a column address Y-ADDR.

The memory cell array 520 may include a plurality of memory blocks BLK1 to BLKz, where z is a positive integer. Each or one or more of the plurality of memory blocks BLK1 to BLKz may include a plurality of memory cells. The memory cell array 520 may be connected to the page buffer 550 via bit-lines BL, and may be connected to the row decoder 540 via word-lines WL, string select lines SSL, and ground select lines GSL.

In some example embodiments, the memory cell array 520 may include a three-dimensional memory cell array. The three-dimensional memory cell array may include a plurality of NAND strings. Each or one or more NAND string may include memory cells respectively connected to the word-lines stacked vertically on a substrate. In some example embodiments, the memory cell array 520 may include a two-dimensional memory cell array. The two-dimensional memory cell array may include a plurality of NAND strings arranged along row and column directions.

The page buffer 550 may include a plurality of page buffers PB1 to PBn, where n is an integer greater than or equal to 3. The plurality of page buffers PB1 to PBn may be connected to the memory cells via the plurality of bit-lines BL, respectively. The page buffer 550 may select at least one bit-line from among the bit-lines BL in response to the column address Y-ADDR. The page buffer 550 may act as a write-in driver and/or a sensing amplifier depending on an operation mode. For example, in a programming operation, the page buffer 550 may apply a bit-line voltage corresponding to data to be programmed to the selected bit-line. In a reading operation, the page buffer 550 may detect current and/or voltage of the selected bit-line detect and thus detect the data stored in the memory cell based on the detected current and/or voltage.

The voltage generator 530 may generate various kinds of voltages for performing programing, reading, and/or erasing operations, based on the voltage control signal CTRL_vol. For example, the voltage generator 530 may generate a program voltage, a read voltage, a program verification voltage, and/or an erase voltage, etc. as the word-line voltage VWL.

The row decoder 540 may select one of the plurality of word-lines WL in response to the row address X-ADDR and may select one of the plurality of string select lines SSL. For example, in a programming operation, the row decoder 540 may apply the program voltage and the program verification voltage to the selected word-line, and may apply the read voltage to the selected word-line in a reading operation.

Figure 6:
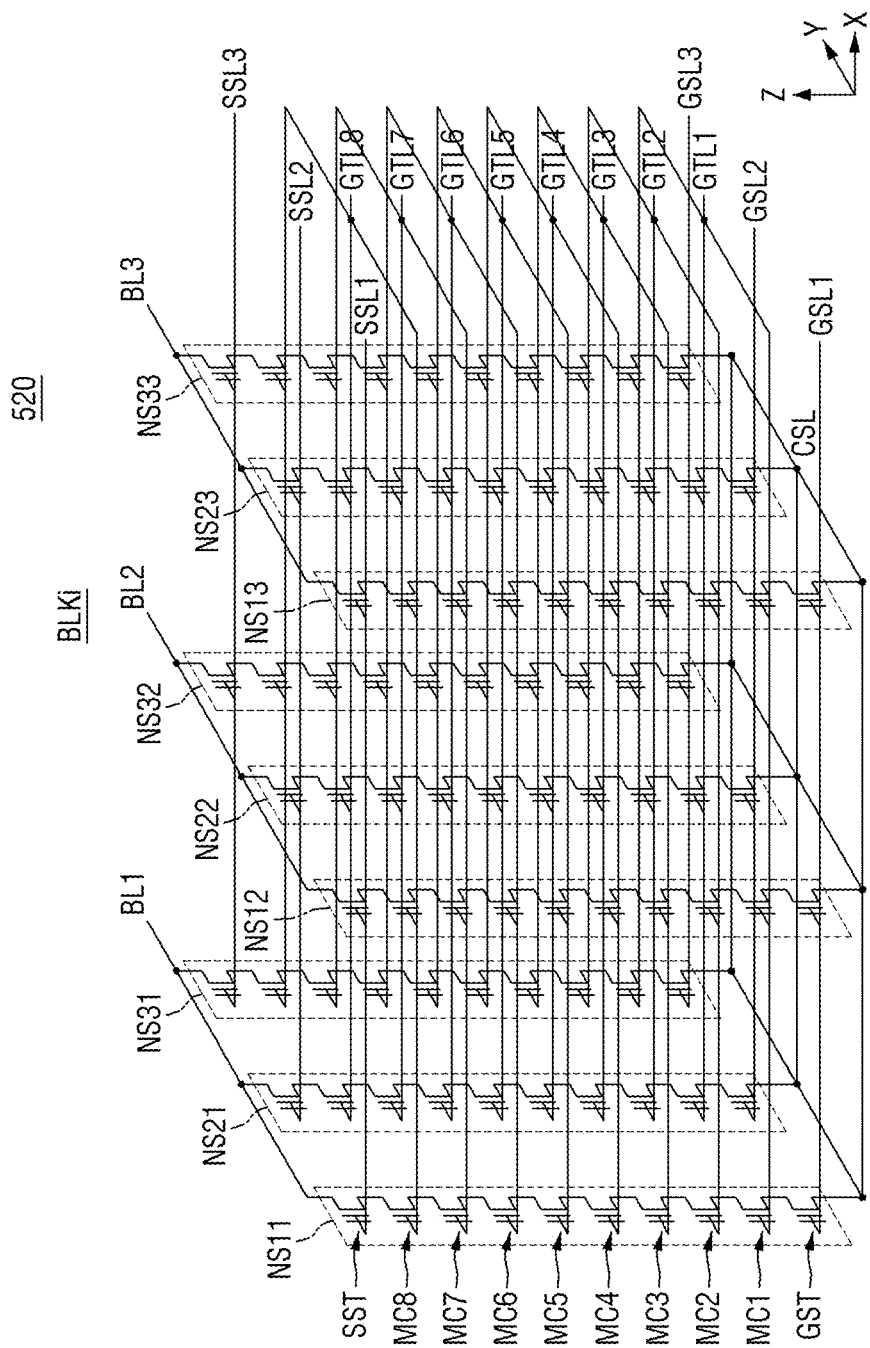
FIG. 6 is a diagram for illustrating a 3D V-NAND structure that may be applied to a non-volatile memory according to some embodiments.

FIG. 6 is a diagram for illustrating a 3D V-NAND structure that may be applied to a non-volatile memory according to some example embodiments. When a storage module of the storage device is implemented as a 3D V-NAND type flash memory, each or one or more of the plurality of memory blocks constituting the storage module may be represented by an equivalent circuit as shown in FIG. 6.

A memory block BLKi shown in FIG. 6 represents a three-dimensional memory block formed in a three-dimensional structure on the substrate. For example, a plurality of memory NAND strings included in the memory block BLKi may extend in a direction perpendicular to the substrate.

Referring to FIG. 6, the memory block BLKi may include a plurality of memory NAND strings NS11 to NS33 disposed between and connected to bit-lines BL1, BL2, BL3 and the common source line CSL. Each or one or more of the plurality of memory NAND strings NS11 to NS33 may include a string select transistor SST, a plurality of memory cells MC1, MC2, . . . , MC8 and/or a ground select transistor GST. In FIG. 6, an example in which each or one or more of the plurality of memory NAND strings NS11 to NS33 includes eight memory cells MC1, MC2, . . . , MC8 is illustrated. However, example embodiments of the inventive concepts are not necessarily limited thereto.

The string select transistor SST may be connected to a corresponding one of string select lines SSL1, SSL2 and SSL3. The plurality of memory cells MC1, MC2, . . . , MC8 may be connected to the corresponding gate lines GTL1, GTL2, . . . , GTL8, respectively. Gate lines GTL1, GTL2, . . . , GTL8 may act as word-lines. Some of the gate lines GTL1, GTL2, . . . , GTL8 may act as dummy word-lines. The ground select transistor GST may be connected to a corresponding one of ground select lines GSL1, GSL2, and GSL3. The string select transistor SST may be connected to a corresponding one of the bit-lines BL1, BL2, and BL3, while the ground select transistor GST may be connected to the common source line CSL.

The word-lines at the same vertical level may be integrated into one word line. The ground select lines GSL1, GSL2, and GSL3 may be separated from each other. The string select lines SSL1, SSL2, and SSL3 may be separated from each other. FIG. 6 shows an example in which the memory block BLK is connected to the eight gate lines GTL1, GTL2, . . . , GTL8 and the three bit-lines BL1, BL2, and BL3. However, the example embodiments of the inventive concepts are not necessarily limited thereto.

Figure 7:
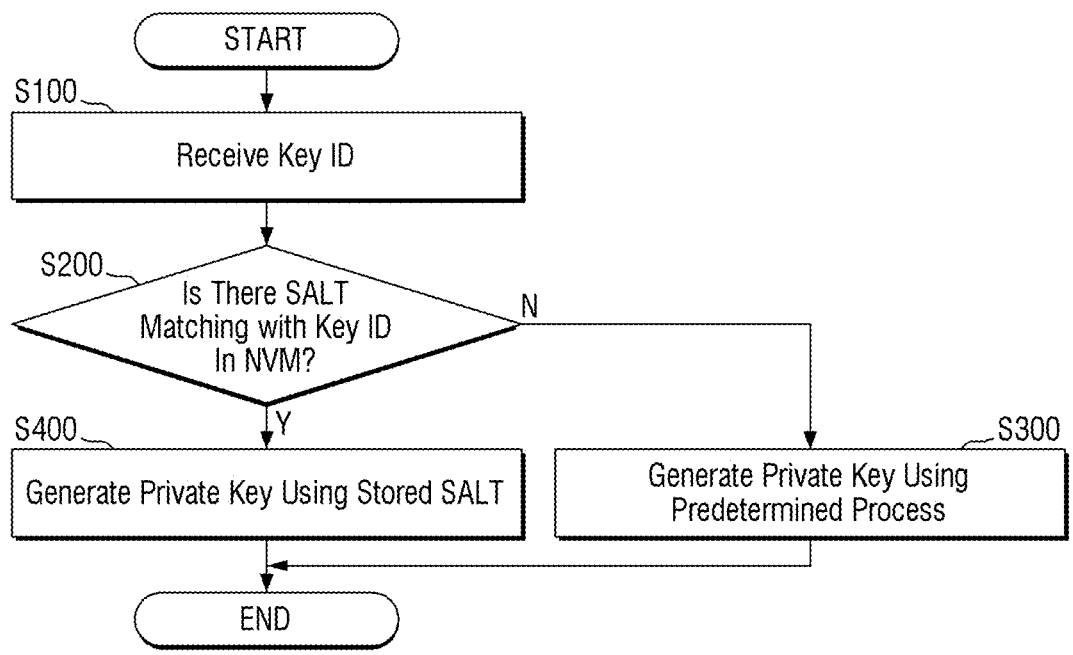
FIG. 7 is a flowchart for illustrating a private key generating operation of a key generator according to some example embodiments.

FIG. 7 is a flowchart for illustrating a private key generating operation in a key generator according to some example embodiments. FIGS. 8 to 13 are diagrams for illustrating a private key generating operation in the key generator.

Referring to FIG. 7, the private key generating operation starts. The operation of generating the private key may start, for example, when the storage device (200 in FIG. 1) is booted up and/or when power is supplied to the storage device (200 in FIG. 1). However, example embodiments are not limited thereto. In another example, the operation of generating the private key may start, for example, in response to a command provided from the host device (100 in FIG. 1) and/or an interrupt signal provided from an external component.

Referring to FIG. 7, the key generator receives a key ID in S100.

Figure 8:
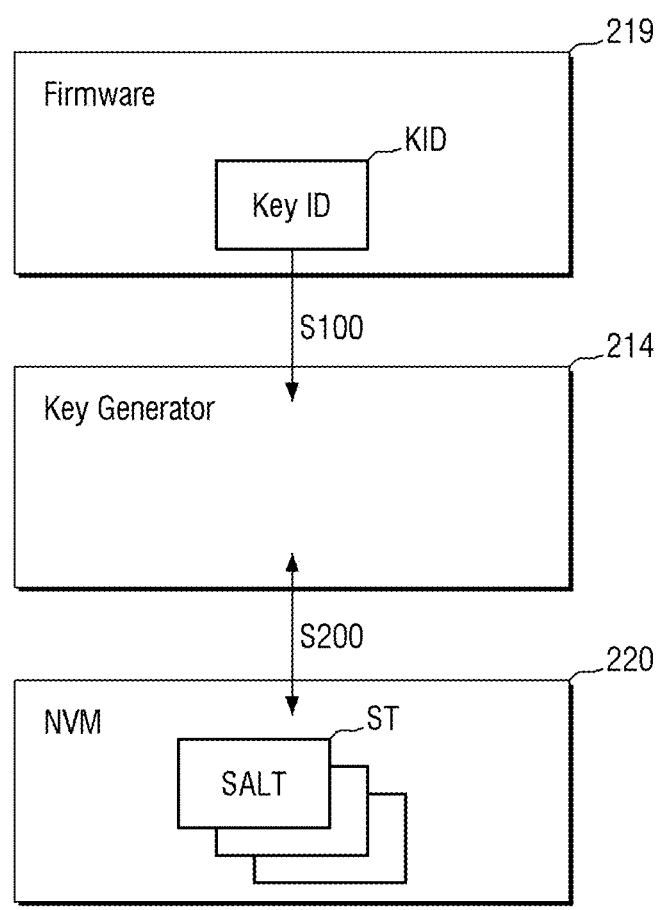
FIGS. 8 to 13 are diagrams for illustrating a private key generating operation of a key generator according to some example embodiments.

For example, referring to FIG. 8, the key generator 214 may receive the key ID KID from the firmware 219 operating the storage device. In some example embodiments, the firmware 219 may input the key ID KID to the key generator to invoke the key generator 214.

Referring to FIG. 7, the key generator may identify whether the salt value matching the key ID is stored in the non-volatile memory in S200. For example, referring to FIG. 8, the key generator 214 may identify whether the salt value ST matching the key ID KID provided from the firmware 219 is stored in the non-volatile memory 220.

Referring to FIG. 7, when the salt value matching the key ID is not stored in the non-volatile memory (S200-N), the key generator may generate the private key according to a predetermined (or alternately given) process in S300. Conversely, when the salt value matching the key ID is stored in the non-volatile memory (S200-Y), the key generator may generate the private key using the salt value stored in the non-volatile memory in S400.

Hereinafter, with reference to FIG. 9 to FIG. 12, the operation S300 of generating the private key according to the predetermined (or alternately given) process will be first described.

Figure 9:
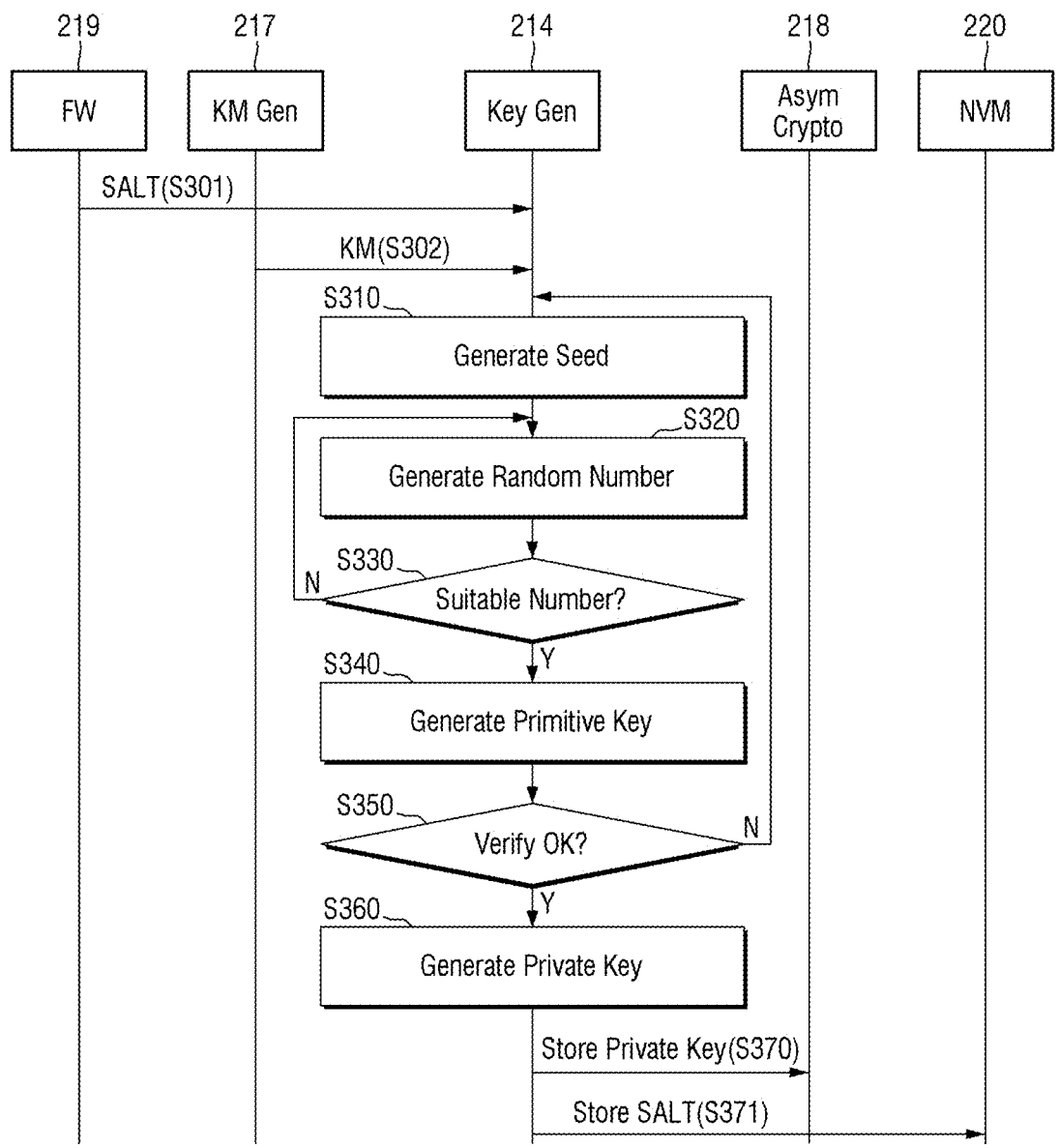
Figure 10:
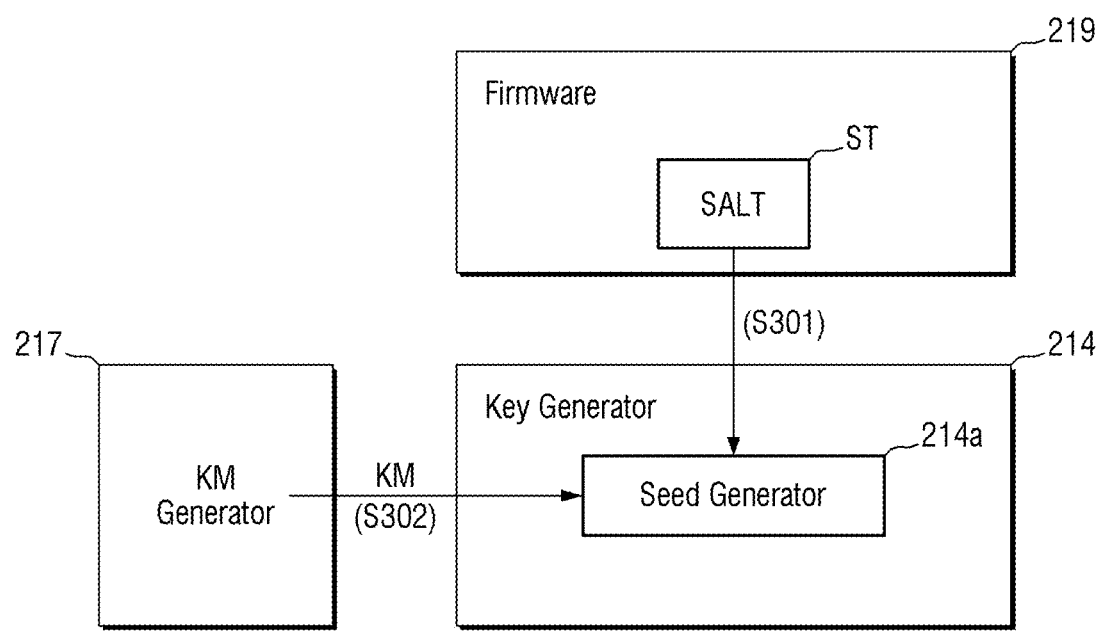

Referring to FIG. 9 and FIG. 10, the seed generator 214a of the key generator 214 receives the salt value ST from the firmware 219 in S301. Then, the key generator 214 receives a key material KM from the key material generator 217 in S302.

In this connection, because the firmware 219 inputs the salt value ST to the key generator 214 to invoke the key generator 214, the firmware 219 cannot access the key material KM generated by the key material generator 217. Therefore, even when a security issue occurs, for example, the firmware 219 is hacked, the private key generated by the key generator 214 may be protected safely. That is, security reliability of the storage device 200 may be improved.

In this connection, the key material KM may be unique information related to the storage device 200. The key material KM may be generated using, for example, at least one of PUF and OTP. However, example embodiments are not limited thereto.

Figure 11:
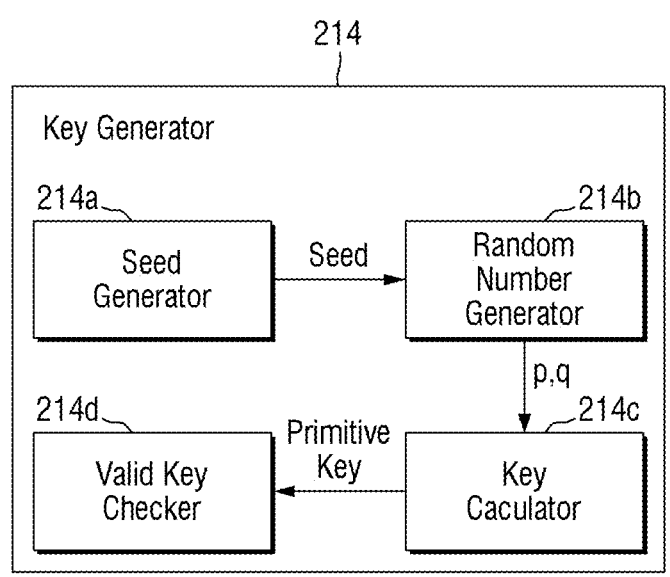

Next, referring to FIG. 9 and FIG. 11, the seed generator 214a of the key generator 214 generates a seed based on the salt value ST provided from the firmware 219 and the key material KM provided from the key material generator 217 in S310.

In some example embodiments, the seed generator 214a may generate, as the seed, a hash value based on the salt value ST provided from the firmware 219 and the key material KM provided from the key material generator 217. However, example embodiments are not limited thereto.

Next, referring to FIG. 9 and FIG. 11, the random number generator 214b of the key generator 214 generates the random number based on the seed generated by the seed generator 214a in S320.

In some example embodiments, the random number generator 214b may include the DRBG. When the random number generator 214b includes the DRBG, the random number generator 214b may generate the same result value via a deterministic algorithm on the same seed (input).

In some example embodiments, the random number generator 214b may generate random numbers p and q based on the seed generated by the seed generator 214a in S320. Then, the random number generator 214b may identify whether each or one or more of p and q is an appropriate number for generating the private key in S330. In some example embodiments, the random number generator 214b may identify whether each or one or more of p and/or q is a prime number. However, example embodiments are not limited thereto.

The random number generator 214b identifies whether each or one or more of p and/or q is the prime number. When each or one or more of p and/or q is the prime number (S330-Y), the random number generator 214b provides p and/or q to the key calculator 214c.

Conversely, when each or one or more of p and/or q is not the prime number (S330-N), the random number generator 214b re-generates p and/or q in S320.

Next, referring to FIG. 9 and FIG. 11, the key calculator 214c of the key generator 214 generates the primitive key based on the random number generated by the random number generator 214b in S340.

For example, the key calculator 214c may receive the random number generated by the random number generator 214b and perform a predetermined (or alternately given) calculation thereon to generate the primitive key.

Next, referring to FIG. 9 and FIG. 11, the valid key checker 214d of the key generator 214 verifies the primitive key generated by the key calculator 214c in S350.

For example, the valid key checker 214d may compare the primitive key generated by the key calculator 214c with the public key and identify whether both are mutually relatively prime.

Figure 12:
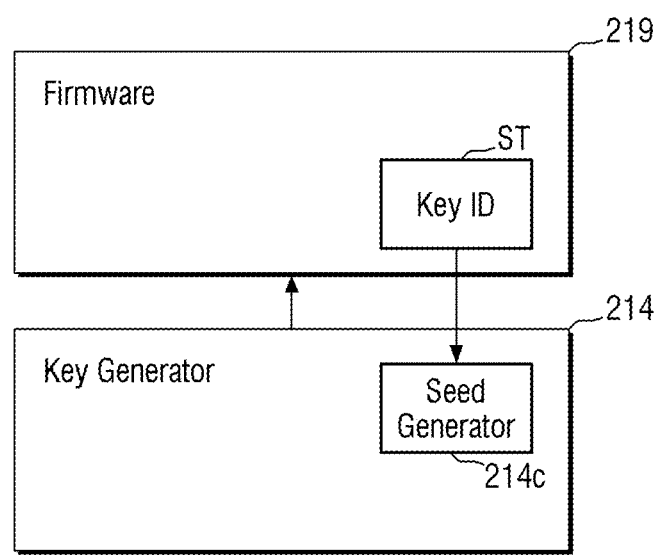

When it is determined based on a result of the verification that the primitive key generated by the key calculator 214c and the public key are not mutually relatively prime (S350-N), the key generator 214 requests a new salt value ST to the firmware 219 as shown in FIG. 12. In response to the request, the firmware 219 may provide the new salt value ST to the key generator 214. In order that the seed generating operation S310 is again performed, the firmware 219 may provide the new salt value ST to the seed generator 214c. For example, the firmware 219 may input the new salt value ST to the key generator 214 to again invoke the key generator 214.

When it is determined based on a result of the verification that the primitive key generated by the key calculator 214c and the public key are mutually relatively prime (S350-Y), the key generator 214 generates the private key using the primitive key in S360.

Then, the key generator 214 provides the generated private key to the asymmetric cryptographic module 218 in S370. The asymmetric cryptographic module 218 may store the transmitted private key therein, which in turn will be used for the encryption operation of the asymmetric cryptographic module 218.

Then, the key generator 214 stores the salt value used for generating the private key in the non-volatile memory 220 in S371. In this connection, the salt value may be stored in the non-volatile memory 220 in a matching manner with the key ID (KID in FIG. 8) provided from the firmware.

A reason why the key generator 214 stores the salt value used for generating the private key in the non-volatile memory 220 is that the key generator 214 may generate the private key at a high speed when the private key should be generated later. If the salt value used for generating the private key is not stored in the non-volatile memory 220, the verification operation (S350 in FIG. 9) as described above may be repeated whenever the storage device is booted up or powered on. This repeated operation may lead to performance degradation of the storage device. Thus, this problem may be reduced or removed in the storage device according to the present embodiment.

In other words, even when the firmware of the storage device is hacked, the key used for the encryption operation may be generated at a high or improved speed while maintaining or improving security.

Figure 13:
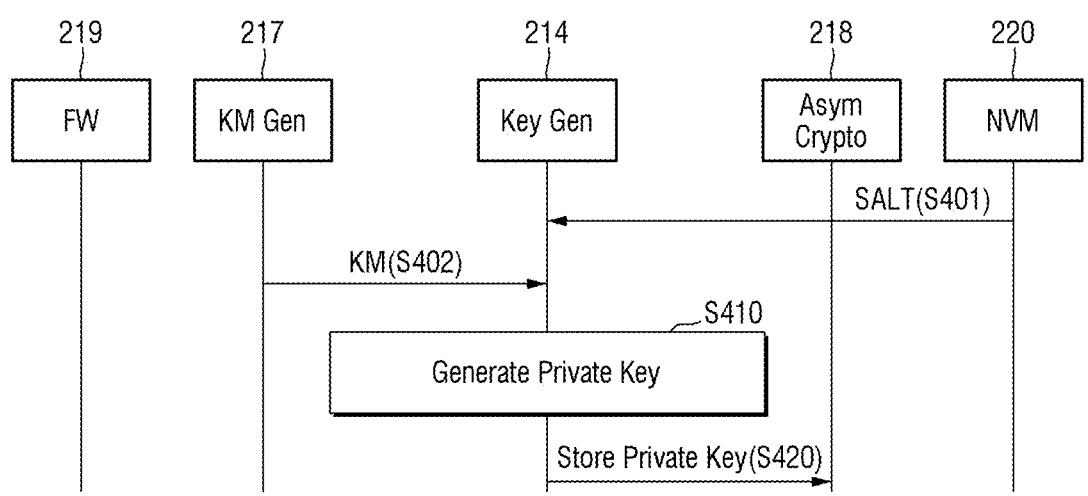

Next, referring to FIG. 13, the operation (S400 in FIG. 7) of generating the private key using the salt value stored in the non-volatile memory is described.

Referring to FIG. 13, because the salt value stored in the non-volatile memory is present, the key generator 214 receives the salt value from the non-volatile memory 220 in S401. Then, the key generator 214 receives the key material KM from the key material generator 217 in S402.

Then, the key generator 214 generates the private key based on the salt value provided from the non-volatile memory 220 and the key material KM provided from the key material generator 217 S410. The generating operation is similar to the operation shown in FIG. 9. However, the private key may be generated with a single time verification.

Thereafter, the key generator 214 provides the generated private key to the asymmetric cryptographic module 218 in S420. The asymmetric cryptographic module 218 may store the transmitted private key therein, which in turn will be used for the encryption operation of the asymmetric cryptographic module 218.

Figure 14:
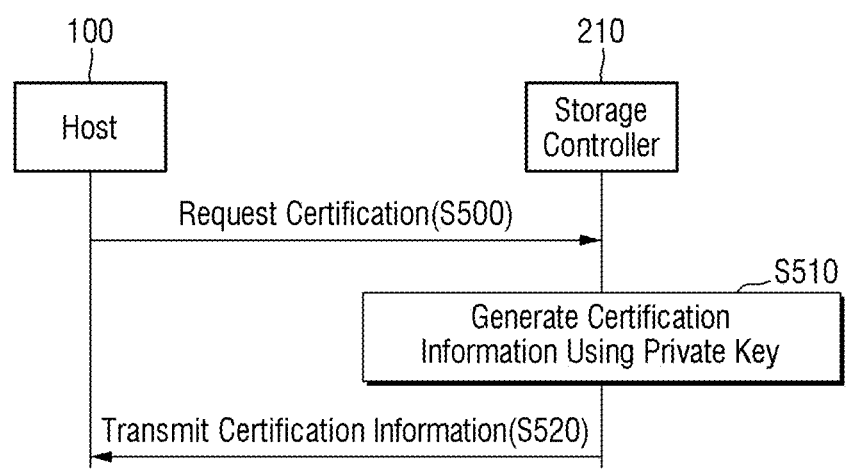
FIG. 14 is a flowchart for illustrating an operation for performing certification of a storage device according to some example embodiments.
Figure 15:
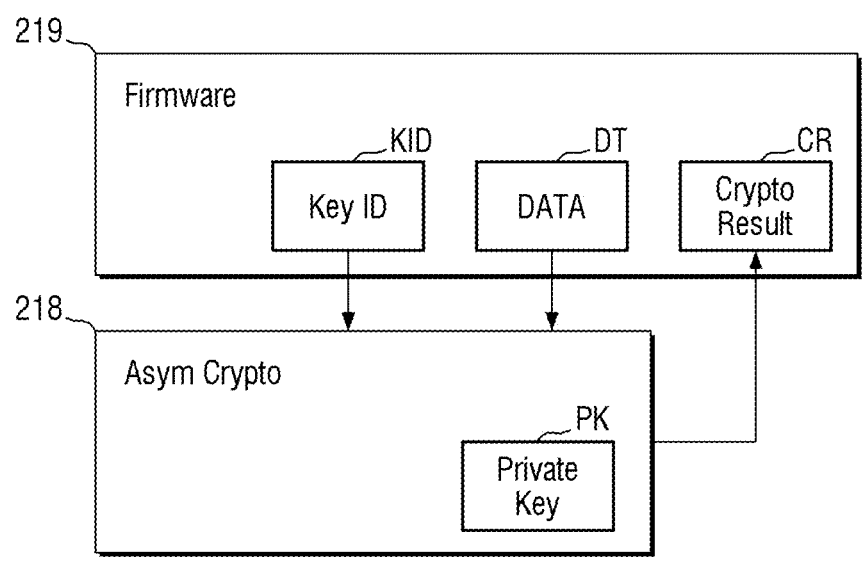
FIG. 15 is a diagram for illustrating an operation for performing certification of a storage device according to some example embodiments.

FIG. 14 is a flowchart for illustrating an operation for performing certification of a storage device according to some example embodiments. FIG. 15 is a diagram for illustrating an operation for performing certification of a storage device according to some example embodiments.

First, referring to FIG. 14, the host device 100 requests certification to the storage controller 210 in S500.

Upon receiving the certification request, the storage controller 210 generates certification information using the private key in S510.

For example, referring to FIG. 15, the firmware 219 provides the key ID KID and/or data DT provided, for example, from the host device 100 to the asymmetric cryptographic module 218. For example, the firmware 219 may input the key ID KID and/or the data DT to the asymmetric cryptographic module 218 to invoke the asymmetric cryptographic module 218.

The asymmetric cryptographic module 218 may encrypt the data DT using the private key PK stored therein, and transmit an encrypted result CR to the firmware 219.

In this connection, the private key PK stored in the asymmetric cryptographic module 218 may be the private key PK generated via the operations as described above. That is, the private key PK stored in the asymmetric cryptographic module 218 may be the private key PK as generated via the operation as shown in FIG. 9, or may be the private key PK as generated via the operation shown in FIG. 14.

Next, referring to FIG. 14, the storage controller 210 transmits the certification information encrypted with the private key to the host device 100 in S520. In one example, the host device 100 may certify the encrypted certification information using the public key.

Figure 16:
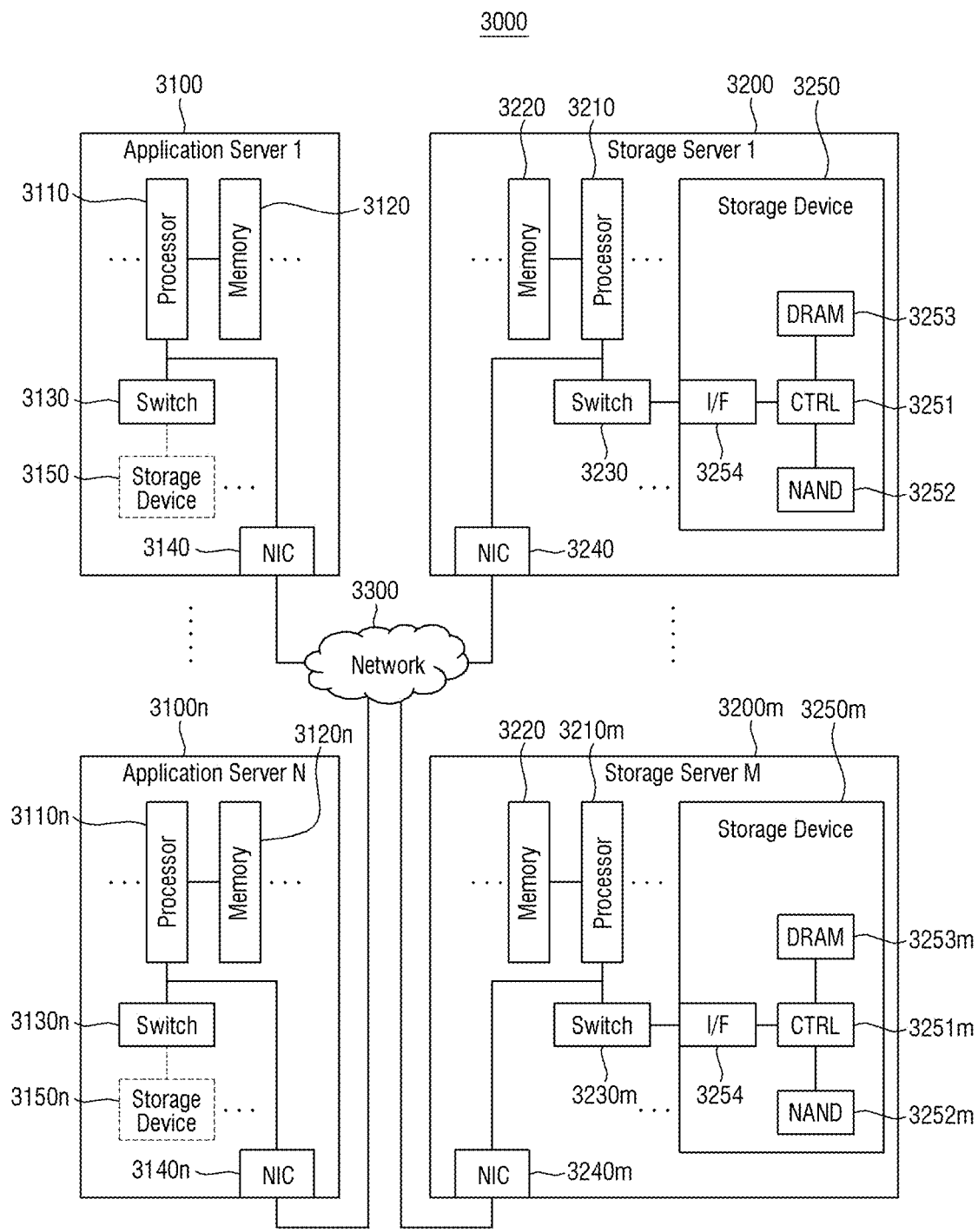
FIG. 16 is a diagram illustrating a data center to which a storage device according to some example embodiments is applied.

FIG. 16 is a diagram illustrating a data center to which a storage device according to some embodiments is applied.

Referring to FIG. 16, the data center 3000 may be a facility that collects various data and provides services, and may be referred to as a data storage center. The data center 3000 may be a system for operating a search engine and/or database, and/or may be a computing system used in a business such as a bank and/or a government institution. The data center 3000 may include application servers 3100 to 3100n and/or storage servers 3200 to 3200m. The number of the application servers 3100 to 3100n and the number of the storage servers 3200 to 3200m may be variously selected according to embodiments. The number of the application servers 3100 to 3100n and the number of the storage servers 3200 to 3200m may be different from each other.

The application server 3100 and/or the storage server 3200 may include at least one of a processor 3110 and/or 3210, and/or a memory 3120 and/or 3220. A configuration of the storage server 3200 will be described by way of example. In this connection, the processor 3210 may control overall operations of the storage server 3200 and may access the memory 3220 to execute instructions and/or data loaded into the memory 3220. The memory 3220 may include DDR SDRAM (Double Data Rate Synchronous DRAM), HBM (High Bandwidth Memory), HMC (Hybrid Memory Cube), DIMM (Dual In-line Memory Module), Optane DIMM, or NVMDIMM (Non-Volatile DIMM). According to some example embodiments, the number of the processors 3210 and/or the number of the memories 3220 included in the storage server 3200 may be variously selected.

In some example embodiments, the processor 3210 and the memory 3220 may provide a processor-memory pair. In some example embodiments, the number of the processors 3210 and the number of the memories 3220 may be different from each other. The processor 3210 may include a single core processor or a multi-core processor. The above descriptions of the storage server 3200 may be similarly applied to the application server 3100. According to some example embodiments, the application server 3100 may not include a storage device 3150. The storage server 3200 may include at least one storage device 3250. The number of the storage devices 3250 included in the storage server 3200 may be variously selected according to some example embodiments.

The application servers 3100 to 3100n and/or the storage servers 3200 to 3200m may communicate with each other over a network 3300. The network 3300 may be implemented using FC (Fiber Channel) or Ethernet. In this connection, FC may be a medium used for relatively high-speed data transmission, and may use an optical switch that provides high performance/high availability. Depending on an access scheme of the network 3300, the storage servers 3200 to 3200m may be embodied as file storage, block storage, and/or object storage, etc.

In some example embodiments, the network 3300 may be embodied as a storage dedicated network such as a SAN (Storage Area Network). For example, the SAN may be an FC-SAN that uses an FC network and is implemented according to a FCP FC Protocol. In some example embodiments, the SAN may be an IP-SAN that uses a TCP/IP network and is implemented according to an iSCSI (SCSI over TCP/IP or Internet SCSI) protocol. In some example embodiments, the network 1300 may be a general network such as a TCP/IP network. For example, the network 1300 may be implemented according to protocols such as FCoE (FC over Ethernet), NAS (Network Attached Storage), and/or NVMe-oF (NVMe over Fabrics), etc.

Hereinafter, descriptions will be focused on the application server 3100 and the storage server 3200. The descriptions of the application server 3100 may be equally applied to other application servers 3100n. The descriptions of the storage server 3200 may be equally applied to other storage servers 3200m.

The application server 3100 may store data in one of the storage servers 3200 to 3200m via the network 3300 upon receiving a request from a user or a client to store the data. Further, the application server 3100 may acquire data from one of the storage servers 3200 to 3200m via the network 3300 upon receiving a request from a user or a client to read the data. For example, the application server 3100 may be implemented as a web server and/or DBMS (Database Management System), etc.

The application server 3100 may access the memory 3120n and/or the storage device 3150n included in another application server 3100n via the network 3300. Alternatively, the application server 3100 may access memories 3220 and/or 3220m and/or the storage devices 3250 to 3250m included in the storage server 3200 to 3200m via the network 3300. Accordingly, the application server 3100 may perform various operations on data stored in the application servers 3100 to 3100n and/or the storage servers 3200 to 3200m. For example, the application server 3100 may execute instructions for moving and/or copying data between the application servers 3100 to 3100n and/or the storage servers 3200 to 3200m. At this time, data may flow from the storage devices 3250 to 3250m to the storage servers 3200 to 3200m through the memories 3220 to 3220m of the storage servers 3200 to 3200m to the memories 3120 to 3120n of the application servers 3100 to 3100n or may be directly delivered from the storage devices 3250 to 3250m to of the storage servers 3200 to 3200m to the memories 3120 to 3120n of the application servers 3100 to 3100n. The data flowing over the network 3300 may be encrypted data for security or privacy.

The storage server 3200 is described by way of example. An interface 3254 may provide a physical connection between the processor 3210 and a controller 3251 and a physical connection between an NIC 3240 and the controller 3251. For example, the interface 3254 may be implemented in a DAS (Direct Attached Storage) scheme in which the storage device 3250 is directly connected to a dedicated cable. Further, for example, the interface 3254 may be implemented in various interface schemes such as ATA (Advanced Technology Attachment), SATA (Serial ATA), e-SATA (external SATA), SCSI (Small Computer Small Interface), SAS (Serial Attached SCSI), PCI (Peripheral Component Interconnection), PCIe (PCI express), NVMe (NVM express), IEEE 1394, USB (universal serial bus), SD (secure digital) card, MMC (multi-media card), eMMC (embedded multi-media card), UFS (Universal Flash Storage), eUFS (embedded Universal Flash Storage), and/or CF (compact flash) card interface, etc.

The storage server 3200 may further include a switch 3230 and/or the NIC 3240. The switch 3230 may selectively connect the processor 3210 and the storage device 3250 to each other or selectively connect the NIC 3240 and the storage device 3250 to each other under control of the processor 3210.

In some example embodiments, the NIC 3240 may include a network interface card, a network adapter, and/or the like. The NIC 3240 may be connected to the network 3300 via a wired interface, a wireless interface, a Bluetooth interface, and/or an optical interface, etc. The NIC 3240 may include am internal memory, DSP, a host bus interface, etc., and may be connected to the processor 3210 and/or the switch 3230 via the host bus interface. The host bus interface may be implemented as one of the examples of the interface 3254 as described above. In some example embodiments, the NIC 3240 may be integrated with at least one of the processor 3210, the switch 3230, and/or the storage device 3250.

In the storage servers 3200 to 3200m or the application servers 3100 to 3100n, the processor may transmit a command to the storage devices 3130 to 3130n and 3250 to 3250m or the memories 3120 to 3120n and 3220 to 3220m to program or read data thereto or therefrom. In this case, the data may be data error-corrected via the ECC (Error Correction Code) engine. The data may be data subjected to DBI (Data Bus Inversion) or DM (Data Masking), and may include CRC (Cyclic Redundancy Code) information. The data may be encrypted data for security or privacy.

The storage devices 3150 to 3150m and/or 3250 to 3250m may transmit a control signal and/or a command/address signal to the NAND flash memory devices 3252 to 3252m in response to a read command received from the processor. Accordingly, when the data is read-out from the NAND flash memory devices 3252 to 3252m, a RE (Read Enable) signal may be input as a data output control signal to allow the data to be output to a DQ bus. DQS (Data Strobe) may be generated using the RE signal. The command and/or address signals may be latched into the page buffer according to a rising edge and/or a falling edge of the WE (Write Enable) signal.

The controller 3251 may control overall operations of the storage device 3250. In one embodiment, the controller 3251 may include SRAM (Static Random Access Memory). The controller 3251 may write data to the NAND flash 3252 in response to a write-in command. Alternatively, the controller 3251 may read-out data from the NAND flash 3252 in response to a read-out command. For example, the write-in command and/or the read-out command may be provided from the processor 3210 in the storage server 3200, the processor 3210m in another storage server 3200m, and/or the processor 3110 and/or 3110n in the application server 3100 and/or 3100n. In some embodiments, the controller 3251 may have a configuration similar to that of the storage controller (210 in FIG. 1) as described above. In some embodiments, the controller 3251 may include the key generator (214 in FIG. 1) as described above. The salt value (ST of FIG. 1) used for generating the private key as described above may be stored in the NAND flash 3252.

A DRAM 3253 may temporarily store (buffer) therein data to be written to the NAND flash 3252 and/or data read-out from the NAND flash 3252. Further, the DRAM 3253 may store therein meta data. In this connection, the meta data may be user data and/or data generated by the controller 3251 to manage the NAND flash 3252. The storage device 3250 may include SE (Secure Element) for security or privacy.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Although some example embodiments of the inventive concepts have been described above with reference to the accompanying drawings, the inventive concepts may not be limited to the example embodiments and may be implemented in various different forms. Those of ordinary skill in the technical field to which the inventive concepts belongs will be able to understand that the inventive concepts may be implemented in other specific forms without changing the inventive concepts or essential features of the present disclosure. Therefore, it should be understood that the example embodiments as described above are illustrative in all respects and are not restrictive.

What is claimed is:

1. A storage device for receiving a command from a host device and storing data in response to the command, the storage device comprising:
    a non-volatile memory; and
    a storage controller configured to:
        control an operation of the non-volatile memory;
        generate a key material;
        receive a key identification (ID) from a firmware;
        determine whether a salt value matching the key ID is stored in the non-volatile memory;
        generate a private key using the salt value stored in the non-volatile memory and the key material in response to determining that the salt value matching the key ID is stored in the non-volatile memory; and
        in response to determining that the salt value matching the key ID is not stored in the non-volatile memory, receive a salt value from the firmware and generate the private key using the salt value from the firmware and the key material, and
        store the salt value used for generating the private key in the non-volatile memory.

2. The storage device of claim 1, wherein the key material is unique information related to the storage device.

3. The storage device of claim 2, wherein the storage controller is configured to generate the key material using at least one of a physical unclonable function (PUF) or a one time password OTP).

4. The storage device of claim 1, wherein the storage controller is configured to perform an asymmetric encryption operation using an asymmetric-key algorithm.

5. The storage device of claim 1, wherein the storage controller is configured to:
    generate a seed based on the key material and the salt value used for generating the private key;
    generate a random number based on the seed;
    generate a primitive key based on the random number; and
    verify the primitive key.

6. The storage device of claim 5, wherein the storage controller is configured to generate the seed by generating a hash value based on the salt value used for generating the private key and the key material.

7. The storage device of claim 5, wherein the storage controller is configured to generate a first random number and a second random number based on the seed using a deterministic random bit generator (DRBG).

8. The storage device of claim 7, wherein the storage controller is configured to:
    identify whether each of the first random number and the second random number is a prime number;
    generate the primitive key based on the first random number and the second random number in response to each of the first random number and the second random number being the prime number; and
    re-generate the first random number and the second random number in response to each of the first random number and the second random number not being the prime number.

9. The storage device of claim 5, wherein the storage controller is configured to:
    determine whether the primitive key and a public key are mutually relatively prime;
    generate the private key using the primitive key in response to determining that the primitive key and the public key are mutually relatively prime; and
    request a new salt value from the firmware in response to determining that the primitive key and the public key are not mutually relatively prime.

10. A storage device comprising:
    a non-volatile memory; and
    a storage controller configured to:
        control an operation of the non-volatile memory;
        generate a key material;
        receive a salt value from a firmware;
        generate a private key using the salt value received from the firmware and the key material;
        store the salt value in the non-volatile memory; and
        perform an asymmetric encryption operation using an asymmetric-key algorithm and the generated private key.

11. The storage device of claim 10, wherein the firmware cannot access the key material.

12. The storage device of claim 10, wherein the storage controller is configured to perform at least one of an encryption operation or a decryption operation on input data using a symmetric-key algorithm.

13. The storage device of claim 10, wherein the storage controller is configured to:
    generate the key material using at least one of a physical unclonable function (PUF) or a one time password (OTP), wherein the key material is unique information related to the storage device.

14. The storage device of claim 10, wherein the storage controller is configured to:
    generate a seed based on the salt value and the key material;
    generate a random number based on the seed;
    generate a primitive key based on the random number; and
    verify the primitive key.

15. The storage device of claim 14, wherein the storage controller is configured to:
    generate a first random number and a second random number based on the seed using a deterministic random bit generator (DRBG);
    determine whether each of the first random number and the second random number is a prime number;
    generate the primitive key based on the first random number and the second random number in response to determining that each of the first random number and the second random number is the prime number; and
    re-generate the first random number and the second random number in response to determining that each of the first random number and the second random number is not the prime number.

16. The storage device of claim 15, wherein the storage controller is configured to determine whether the primitive key and a public key are mutually relatively prime, generate the private key using the primitive key in response to determining that the primitive key and the public key are mutually relatively prime; and request a new salt value from the firmware in response to determining that the primitive key and the public key are not mutually relatively prime.

17. A storage device comprising:
a non-volatile memory; and
a storage controller configured to:
   control an operation of the non-volatile memory;
   receive a certification request from a host device;
   generate certification information based on a private key in response to receiving the certification request, wherein the private key is generated using a salt value received from a firmware and a key material generated by a key material generator; and
   transmit the certification information to the host device.

18. The storage device of claim 17, wherein the storage controller is configured to generate the private key before receiving the certification request from the host device, and store the private key.

19. The storage device of claim 18, wherein the salt value stored in the non-volatile memory is a salt value used to generate the private key among a plurality of salt values provided from a firmware.

* * * * *